(12) United States Patent
Shang et al.

(10) Patent No.: US 12,511,477 B2
(45) Date of Patent: Dec. 30, 2025

(54) METHODS AND DEVICES FOR GENERATING SENSITIVE TEXT DETECTORS

(71) Applicant: HUAWEI TECHNOLOGIES CO., LTD., Guangdong (CN)

(72) Inventors: Zhiwei Shang, Waterloo (CA); Luyun Lin, Richmond Hill (CA); Zhijun Mo, Waterloo (CA)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 888 days.

(21) Appl. No.: 17/565,770

(22) Filed: Dec. 30, 2021

(65) Prior Publication Data
US 2023/0214591 A1    Jul. 6, 2023

(51) Int. Cl.
*G06F 40/279* (2020.01)
*G06F 18/2113* (2023.01)
*G06F 18/22* (2023.01)
*G06N 20/00* (2019.01)

(52) U.S. Cl.
CPC ........ *G06F 40/279* (2020.01); *G06F 18/2113* (2023.01); *G06F 18/22* (2023.01); *G06N 20/00* (2019.01)

(58) Field of Classification Search
CPC .... G06F 40/279; G06F 18/2113; G06F 18/22; G06F 40/253; G06F 40/284; G06F 40/30; G06N 20/00; G06N 3/126
USPC .......................................................... 704/9
See application file for complete search history.

(56) References Cited

U.S. PATENT DOCUMENTS

| 5,761,640 A * | 6/1998 | Kalyanswamy | G10L 13/08 704/E13.011 |
| 5,946,647 A * | 8/1999 | Miller | G06F 40/289 704/9 |
| 7,254,539 B2 * | 8/2007 | Carberry | H04M 3/4936 712/216 |
| 7,565,368 B2 * | 7/2009 | Zartler | G06F 40/284 707/999.102 |
| 7,730,013 B2 * | 6/2010 | Dill | G06F 16/313 707/715 |

(Continued)

FOREIGN PATENT DOCUMENTS

| CN | 106446232 A | 2/2017 |
| CN | 110580416 A | 12/2019 |

(Continued)

OTHER PUBLICATIONS

PCT International Search Report in Respect of International Application PCT/CN2022/141701, Feb. 14, 2023.

*Primary Examiner* — Thuykhanh Le
(74) *Attorney, Agent, or Firm* — Troutman Pepper Locke LLP; Tim Tingkang Xia, Esq.

(57) ABSTRACT

The present disclosure relates to one or more processors, communicative with one or more computer-readable media, are configured to automatically generate a sensitive text detector including a regular expression or keyword. A set of text inputs, including sensitive text, are received. The sensitive text is extracted from the set of text inputs. Based on the extracted sensitive text, one or both of the regular expression and the keyword are generated. The generated regular expression and/or keyword are used to generate a sensitive text detector for sensitive text detection.

15 Claims, 13 Drawing Sheets

(56) References Cited

U.S. PATENT DOCUMENTS

| | | | | | |
|---|---|---|---|---|---|
| 7,765,097 | B1* | 7/2010 | Yu | | G06F 40/174 |
| | | | | | 704/9 |
| 7,860,872 | B2* | 12/2010 | Serjeantson | | G06F 40/205 |
| | | | | | 707/811 |
| 7,899,827 | B2* | 3/2011 | Boyer | | G16C 20/70 |
| | | | | | 704/7 |
| 7,912,705 | B2* | 3/2011 | Wasson | | G06F 40/169 |
| | | | | | 715/256 |
| 7,950,062 | B1* | 5/2011 | Ren | | G06F 21/55 |
| | | | | | 704/7 |
| 8,131,735 | B2* | 3/2012 | Rose | | G06F 16/313 |
| | | | | | 707/750 |
| 8,239,349 | B2* | 8/2012 | Castellanos | | G06N 3/126 |
| | | | | | 707/610 |
| 10,489,430 | B1* | 11/2019 | Rogynskyy | | G06F 16/355 |
| 10,706,236 | B1* | 7/2020 | Platt | | G06F 40/253 |
| 10,747,958 | B2* | 8/2020 | Nelson | | G06F 40/284 |
| 11,080,294 | B1* | 8/2021 | Johnston | | G06F 40/205 |
| 11,222,179 | B2* | 1/2022 | Wang | | G06N 3/126 |
| 11,681,874 | B2* | 6/2023 | Brousseau | | G06F 40/157 |
| | | | | | 704/9 |
| 11,720,863 | B2* | 8/2023 | Lewis | | G06Q 10/20 |
| | | | | | 704/9 |
| 11,755,680 | B2* | 9/2023 | Jagota | | G06F 16/986 |
| | | | | | 704/9 |
| 11,811,718 | B2* | 11/2023 | Prasad | | G06F 40/30 |
| 12,118,095 | B1* | 10/2024 | Millar | | G06N 20/00 |
| 2004/0088158 | A1* | 5/2004 | Sheu | | G06F 16/24522 |
| | | | | | 704/9 |
| 2006/0047500 | A1* | 3/2006 | Humphreys | | G06F 40/295 |
| | | | | | 704/9 |
| 2006/0245641 | A1* | 11/2006 | Viola | | G06F 40/295 |
| | | | | | 704/9 |
| 2009/0070327 | A1* | 3/2009 | Loeser | | G06F 16/3329 |
| 2009/0119095 | A1* | 5/2009 | Beggelman | | G06F 40/30 |
| | | | | | 704/9 |
| 2009/0248605 | A1* | 10/2009 | Mitchell | | G06F 40/284 |
| | | | | | 704/8 |
| 2010/0318489 | A1* | 12/2010 | De Barros | | G06N 5/04 |
| | | | | | 706/50 |
| 2011/0060747 | A1* | 3/2011 | Rose | | G06F 16/313 |
| | | | | | 707/750 |
| 2012/0089620 | A1* | 4/2012 | Castellanos | | G06N 3/126 |
| | | | | | 707/E17.069 |
| 2013/0204609 | A1* | 8/2013 | Gandhi | | G06F 21/6263 |
| | | | | | 704/9 |
| 2013/0246049 | A1* | 9/2013 | Mirhaji | | G06F 40/284 |
| | | | | | 704/9 |
| 2015/0025875 | A1* | 1/2015 | Perrone | | G06F 40/30 |
| | | | | | 704/9 |
| 2015/0081279 | A1* | 3/2015 | Suleman | | G06F 40/237 |
| | | | | | 704/9 |
| 2015/0186783 | A1* | 7/2015 | Byrne | | G06N 5/022 |
| | | | | | 706/51 |
| 2015/0286630 | A1* | 10/2015 | Bateman | | G06V 30/413 |
| | | | | | 704/9 |
| 2016/0048501 | A1* | 2/2016 | Deshmukh | | G06F 40/40 |
| | | | | | 704/9 |
| 2017/0139899 | A1* | 5/2017 | Zhao | | G06F 40/284 |
| 2018/0143975 | A1* | 5/2018 | Casal | | G06F 40/51 |
| 2018/0239754 | A1* | 8/2018 | Chung | | G10L 13/00 |
| 2018/0285599 | A1* | 10/2018 | Praveen | | G06F 18/22 |
| 2020/0004870 | A1* | 1/2020 | Dulam | | G06F 18/214 |
| 2020/0310888 | A1* | 10/2020 | Gopalan | | G06F 21/31 |
| 2020/0320142 | A1* | 10/2020 | Malak | | G06F 16/242 |
| 2021/0044697 | A1* | 2/2021 | Khafizov | | G06F 18/285 |
| 2021/0097168 | A1* | 4/2021 | Patel | | G06F 21/554 |
| 2021/0103828 | A1* | 4/2021 | Bitterfeld | | G06N 20/20 |
| 2021/0158367 | A1* | 5/2021 | Bhosale | | G06Q 50/18 |
| 2021/0334463 | A1* | 10/2021 | Wang | | G06F 40/295 |
| 2022/0058496 | A1* | 2/2022 | Rusk | | G06N 5/04 |
| 2022/0083544 | A1* | 3/2022 | Tsuji | | G06F 40/30 |
| 2022/0292218 | A1* | 9/2022 | Zarecki | | G06F 21/6254 |
| 2022/0391734 | A1* | 12/2022 | Wang | | G06N 20/00 |
| 2022/0414328 | A1* | 12/2022 | Nguyen | | G06V 30/414 |
| 2023/0196029 | A1* | 6/2023 | Mishraky | | G06F 40/40 |
| | | | | | 704/9 |
| 2023/0205920 | A1* | 6/2023 | French | | G06F 21/6245 |
| | | | | | 726/26 |
| 2025/0094684 | A1* | 3/2025 | Rodrigo | | G06F 40/253 |

FOREIGN PATENT DOCUMENTS

| | | | | |
|---|---|---|---|---|
| CN | 111241133 A | 6/2020 | | |
| CN | 111753332 A | 10/2020 | | |
| WO | WO-2007108728 A2 * | 9/2007 | | G06F 17/27 |

* cited by examiner

FIG. 11

METHODS AND DEVICES FOR GENERATING SENSITIVE TEXT DETECTORS

TECHNICAL FIELD

The present disclosure relates to computer-implemented methods for sensitive data detection or extraction, and in particular methods or devices for generating sensitive text detectors.

BACKGROUND

Data can in general be categorized into three classes: structured data; semi-structured data; and unstructured data. Structured data usually refers to database data that is clearly and strictly organized, with users being able to easily identify what row/column/table is storing what type of data. Semi-structured data usually refers to data that is structured in a way that is either not clear or not easily identifiable. Examples of semi-structured data include HTML, e-mail, and log data. Unstructured data generally refers to data that is organized in an arbitrary way. Free text and media data are typical examples of unstructured data.

Service providers generally collect a lot of information on their clients, including for example their names, addresses, phone numbers, and other sensitive data. Sometimes such data is stored in an unstructured manner, for example in files. In order to protect each user's privacy, any sensitive data that can identify a user should be sanitized (for example by removing or masking the sensitive data). A suitably programmed sensitive text detector is able to locate and extract sensitive data with varying degrees of accuracy. FIG. 1 shows an example of input text 10 that is provided to a sensitive text detector 20. Sensitive text detector 20 outputs detection results 30 in which are identified a number of sensitive text portions, namely "passport" and "N001234".

Existing sensitive text detectors allow their operators to adjust their parameters, depending on the type of text that is being input to the detector. Detectors may therefore be customized to meet their user's needs. However, the process of customizing a sensitive text detector usually involves crafting hand-written rules and is therefore time-consuming. Furthermore, the accuracy of hand-written rules depends to a large degree on the expertise of the user that is programming the detector.

SUMMARY

According to a first aspect of the disclosure, there is disclosed a computer-implemented method of generating a sensitive text detector, comprising: receiving a set of text inputs comprising sensitive text; extracting the sensitive text from the set of text inputs; and generating, based on the extracted sensitive text, one or more of: a regular expression; and a keyword; and generating the sensitive text detector based on the generated one or more of the regular expression and the keyword.

Therefore, a sensitive text detector may be trained based on a set of text inputs. As a result, there may be no need to manually input keywords and/or regular expressions to the sensitive text detector. The efficiency of sensitive text detection may therefore be improved over existing sensitive text detectors.

Generating the regular expression may comprise: converting the extracted sensitive text into one or more regular expressions; generating a population comprising the one or more regular expressions; evolving the population by: transforming at least one of the one or more regular expressions; adding the at least one transformed regular expression to the population; and determining a fitness score for each regular expression in the population; iterating the evolution of the population until a predetermined condition is met; and after iterating the evolution of the population, generating, based on each fitness score, the regular expression.

Accordingly, from among a population of regular expressions, the regular expression that is most likely to successfully identify and extract sensitive text from within a set of text inputs may be generated.

Determining the fitness score may comprise: for each of multiple training samples in a training set of training samples, each training sample either comprising sensitive text or not comprising sensitive text: identifying text within the training sample based on the regular expression; and determining the fitness score based on the identified text.

Determining the fitness score based on the extracted text may comprise: determining one or more of: for each training sample comprising sensitive text, a degree of similarity between the identified text and the sensitive text; and for each training sample not comprising sensitive text, an amount of the identified text.

The fitness score may satisfy the following formula: $f(r)=f_s(r)+f_{char}(r)+L_{score}(r)$, wherein $f_s(r)$ is based on a degree of similarity between all of the identified text and the sensitive text, $f_{char}(r)$ is based on a degree of similarity between a portion of the identified text and the sensitive text, and $L_{score}$ is based on a length of the identified text relative to a length of the sensitive text.

Generating the regular expression may comprise: determining that, among the fitness scores, at least one of the fitness scores is in a steady state; and in response to determining that the at least one of the fitness scores is in the steady state, generating the regular expression associated with the at least one of the fitness scores in the steady state.

Therefore, once a fitness score is determined to be in a steady state, it is assumed that no other regular expressions in the population of regular expressions will be better suited to identifying and extracting sensitive text. Ending the iteration based on detecting a steady state may therefore increase the speed with which the regular expression is generated.

Transforming at least one of the one or more regular expressions may comprise one or more of: randomly modifying a portion of the at least one of the one or more regular expressions; and exchanging a portion of a first one of the one or more regular expressions with a portion of a second one of the one or more regular expressions.

The method may further comprise: inputting text to the sensitive text detector, wherein the inputted text comprises sensitive text associated with one or more regular expressions; and using the sensitive text detector to extract the sensitive text from the inputted text, based on the one or more regular expressions corresponding to the generated regular expression.

Extracting the sensitive text from the set of text inputs may comprise: extracting a range of text based on a location of the sensitive text within the set of text inputs; and the generating may comprise: identifying one or more candidate keywords within the range of text; and generating, based on the one or more candidate keywords, the keyword.

Since keywords relating to sensitive text may tend to be grouped together, extracting a range of text based on a location of the sensitive text within the set of text inputs may increase the accuracy with which the keyword is generated.

Extracting the range of text may comprise: extracting a combination of the sensitive text and text that is one or more of: a preset distance before the sensitive text; and a preset distance after the sensitive text.

Identifying the one or more candidate keywords may comprise: filtering the range of text by removing one or more words from the range of text; and identifying the one or more candidate keywords within the filtered range of text.

Filtering the range of text based on a list of stop words may increase the speed with which the keyword is generated, by ignoring words that are unlikely to relate to sensitive text.

Filtering the range of text may comprise: comparing each word in the range of text to each of multiple words in a list of stop words; and based on the comparison, removing from the range of text any word contained in the list of stop words.

Generating, based on the one or more candidate keywords, the keyword may comprise: calculating one or more of: a co-occurrence in the range of text of each candidate keyword with at least one other candidate keyword; and a number of instances of each candidate keyword in the range of text.

According to some embodiments, the degree to which the co-occurrence of each candidate keyword influences the generation of the keyword, and the degree to which the number of instances of each candidate keyword influences the generation of the keyword, may be adjusted. This may tailor the generation of the keyword depending on the specific needs of the user.

The method may further comprise: inputting text to the sensitive text detector wherein the inputted text comprises sensitive text; and using the sensitive text detector to extract the sensitive text from the inputted text, based on one or more words in the sensitive text corresponding to the generated keyword.

The method may further comprise: applying a check function to the generated regular expression or the generated keyword.

According to a further aspect of the disclosure, there is provided a non-transitory computer-readable medium having stored thereon computer program code configured, when executed by one or more processors, to cause the one or more processors to perform a method comprising: receiving a set of text inputs comprising sensitive text; extracting the sensitive text from the set of text inputs; and generating, based on the extracted sensitive text, one or more of: a regular expression; and a keyword; and generating a sensitive text detector based on the generated one or more of the regular expression and the keyword.

According to a further aspect of the disclosure, there is provided a computing device for generating a sensitive text detector, comprising: one or more processors configured to: receive a set of text inputs comprising sensitive text; extract the sensitive text from the set of text inputs; and generate, based on the extracted sensitive text, one or more of: a regular expression; and a keyword; and generate the sensitive text detector based on the generated one or more of the regular expression and the keyword.

This summary does not necessarily describe the entire scope of all aspects. Other aspects, features, and advantages will be apparent to those of ordinary skill in the art upon review of the following description of specific embodiments.

BRIEF DESCRIPTION OF THE DRAWINGS

Embodiments of the disclosure will now be described in detail in conjunction with the accompanying drawings of which:

FIG. 11 shows an example of keywords being generated based on the position of sensitive text within a set of text inputs, according to an embodiment of the disclosure;

DETAILED DESCRIPTION

The present disclosure relates to novel methods, systems, and computer-readable media for generating regular expressions and keywords, for use in sensitive text detection. While various embodiments of the disclosure are described below, the disclosure is not limited to these embodiments, and variations of these embodiments may well fall within the scope of the disclosure.

Sensitive text detection generally involves three components. The first component is keyword matching, in which keywords are used to locate possible ranges of sensitive text within the text input to the detector. Generally, a keyword defines a particular sequence of characters that may be used as a search parameter when processing text with a sensitive text detector. For example, the keyword "passport" may be used to identify, within a range of text, any sequence of characters that matches, either partially or fully, the keyword. The second component is regular expression ("RegEx") matching, in which predefined regular expressions identified in the text input to the detector are used to extract sensitive text. Generally, a regular expression defines a particular sequence of characters that specifies a text search pattern and that may be used as a search parameter when processing text with a sensitive text detector. For example, the regular expression "\d{3}-\d{3}-\d{3}" indicates three sets of three digits, with each set separated by a hyphen, and could be used to identify a nine-digit phone number within text input. If performing keyword matching prior to regular expression matching, the regular expression matching may be performed only on those ranges of text that have been output by the keyword matching component. Conversely, if performing regular expression matching prior to keyword matching, the keyword matching may be performed only on those ranges of text that have been output by the regular expression matching component. The third component is a validation component. The validation component may filter any text substrings extracted by the keyword matching component and/or the regular expression matching component, so as to reduce the false-positive rate of sensitive text extraction. For example, the validation component may validate check digits if applicable.

Figure 1:
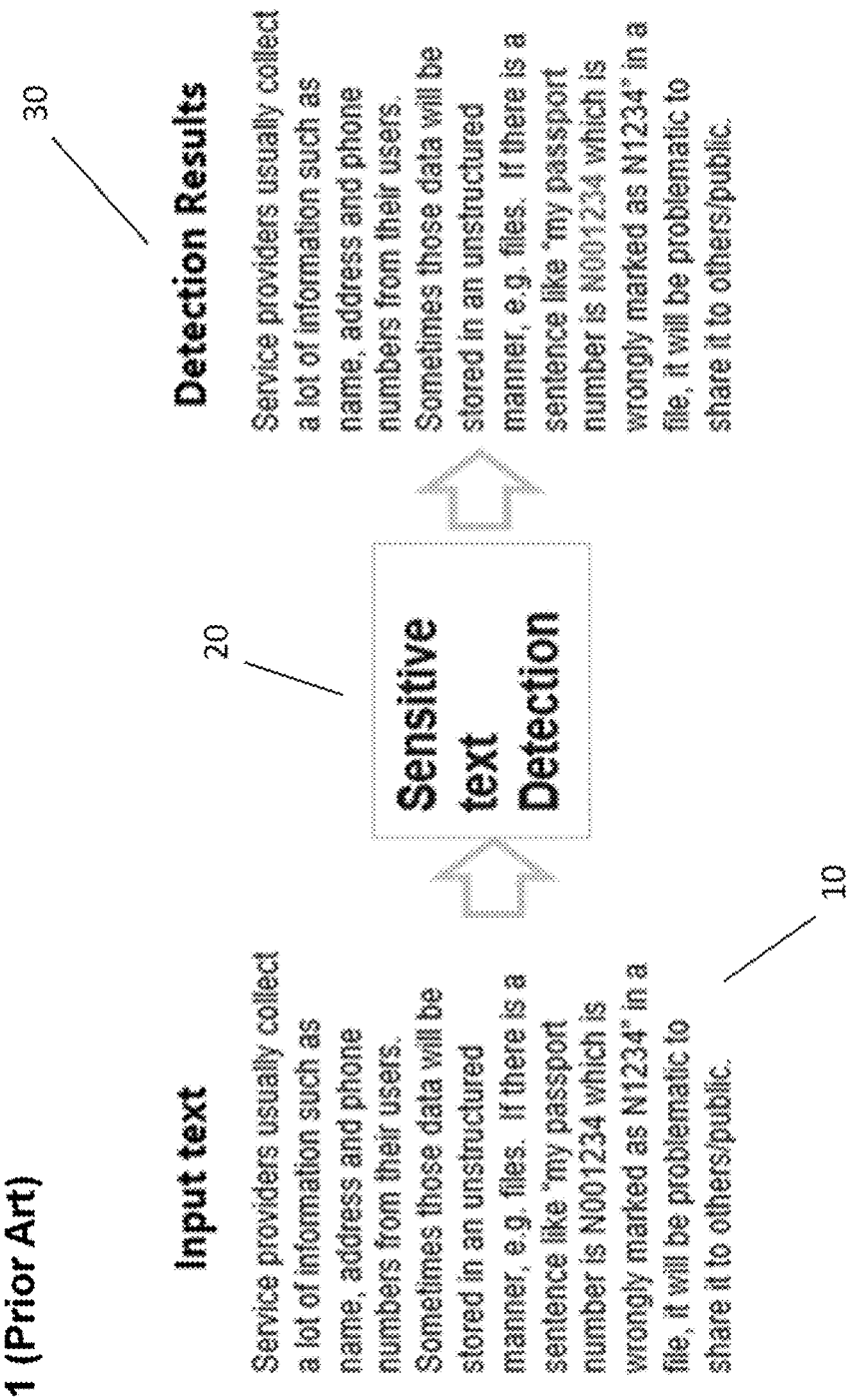
FIG. 1 shows an example of text being input to a sensitive text detector, and sensitive text being identified within the input text.
Figure 2:
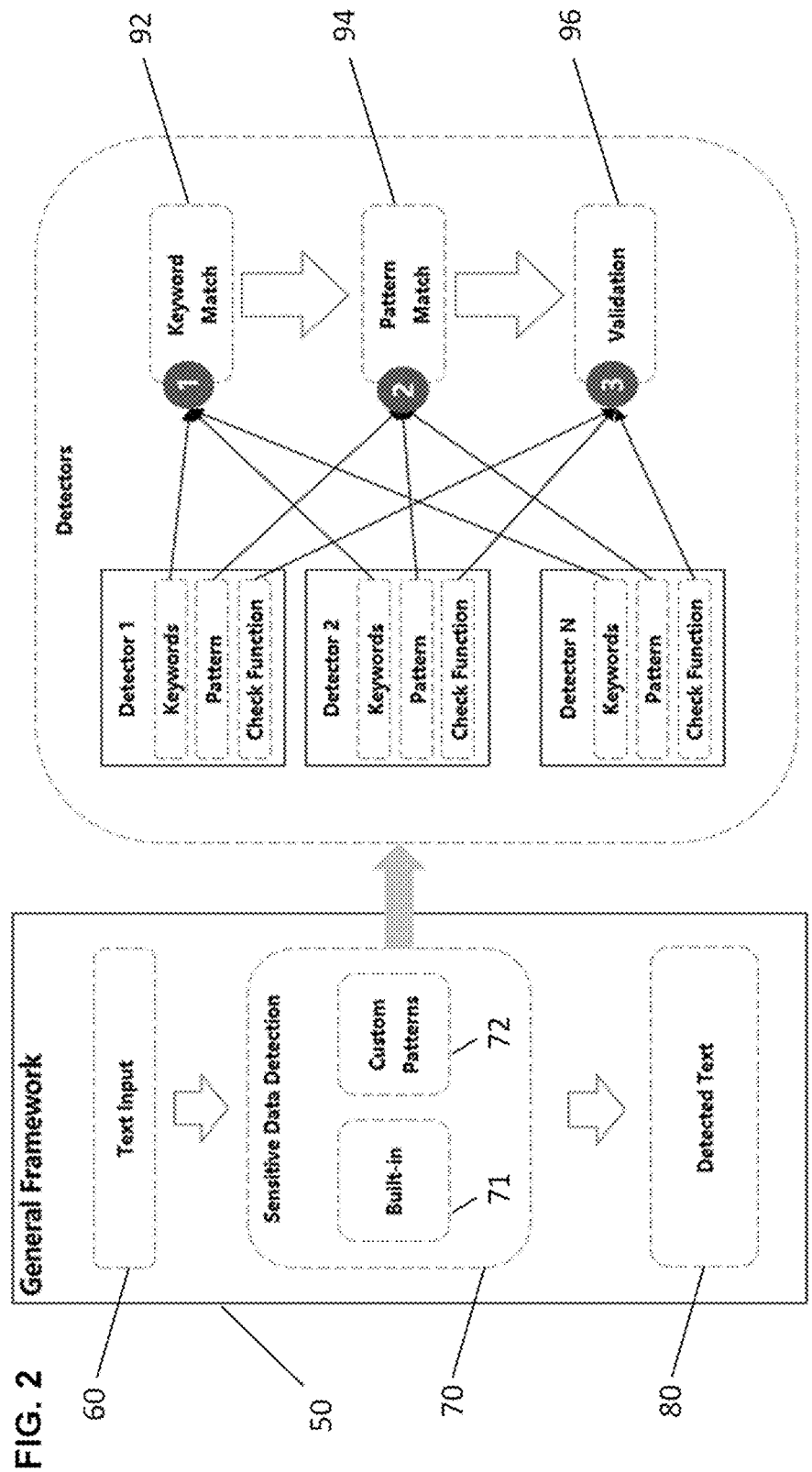
FIG. 2 is a schematic diagram of a sensitive text detector and a sensitive text detector pipeline.

FIG. 2 shows the general framework of a sensitive text detector pipeline 50. Text input 60 is received at a sensitive text detector 70 that includes both a built-in component 71 and a custom component 72. Built-in component 71 may filter text input 60 based on a number of regular expression and/or keyword parameters that are relatively general in nature and that may be applicable to a wide variety of text inputs. In order to produce improved sensitive text extraction, custom component 72 of sensitive text detector 70 is configured to filter text input 60 based on a number of regular expression and/or keyword parameters that are relatively specific to the particular type of text input 60. Typically, and as described above, the regular expression and keyword parameters of custom component 72 may need to be manually written depending on the particular type of text input 60 that is being processed. The output 80 of sensitive text detector 70 comprises sensitive text contained within text input 60 and that is identified by both built-in component 71 and custom component 72.

As can also be seen in FIG. 2, sensitive text detector 70 may be one of a number of different sensitive text detectors (Detector 1 through Detector N) each configured to identify and extract sensitive text from different types of text input. For example, Detector 1 may be configured to extract sensitive text found in a first type of input data, such as passport data, Detector 2 may be configured to extract sensitive text found in a second type of input data, such as driver's licence data, etc. As described above, each sensitive text detector includes its own respective keyword matching component 92, regular expression matching component 94, and validation component 96, the outputs of which may be combined to generate a final set of sensitive text that is extracted from the text input by the detectors.

Many existing sensitive data detection tools such as GOOGLE® DLP, MICROSOFT® Presidio, and AMAZON® Macie allow users to configure the detectors to suit their own needs via the use of hand-crafted rules, as mentioned above (GOOGLE is a registered trademark of Google LLC, Mountain View, CA, USA; MICROSOFT is a registered trademark of Microsoft Corp., Redmond, WA, USA; AMAZON is a registered trademark of Amazon Technologies Inc., Seattle, WA, USA). However, one problem facing this situation is the difficulty one may have in building a sensitive text detector that can maintain a consistent level of accuracy for a wide range of different forms or types of text input. In particular, sensitive data may vary from one scenario to another, and a sensitive text detector may not be able to extract sensitive text from a first set of text input with the same level of accuracy that the same sensitive text detector may extract sensitive text from a second, different set of text input. Furthermore, manually reconfiguring a sensitive text detector may be time-consuming and inefficient.

Therefore, according to embodiments of the disclosure, there are provided computer-implemented methods, devices, and computer-readable media configured to generate a sensitive text detector, and in particular generate one or more regular expressions and one or more keywords for use in a sensitive text detector. In particular, embodiments of the disclosure include devices and software that may be trained on a set of text inputs to extract sensitive text from the set of text inputs, and to generate one or more regular expressions and/or one or more keywords based on the extracted sensitive text. The generated regular expressions and keywords may then be used to customize a sensitive text detector for better detecting sensitive text contained in text that is inputted to the sensitive text detector.

Throughout this disclosure, when reference is made to generating a regular expression and a keyword, it is to be understood that reference is also being made to generating multiple regular expressions and multiple keywords, and vice versa.

According to some embodiments, a heuristic algorithm is used to generate the regular expression from a number of training samples, and an unsupervised keyword extraction algorithm is used to generate the keyword from a number of training samples. Advantageously, the output provided by embodiments described herein may be domain-independent and can be deployed without the need for user expertise in any particular domain. The generated regular expression and keyword may be output in a format suitable for reading by existing sensitive text detection systems.

As evidenced later in the disclosure, reasonable results can be obtained in under minutes, and with an accuracy that is comparable to human-written sensitive text extraction rules.

Figure 3:
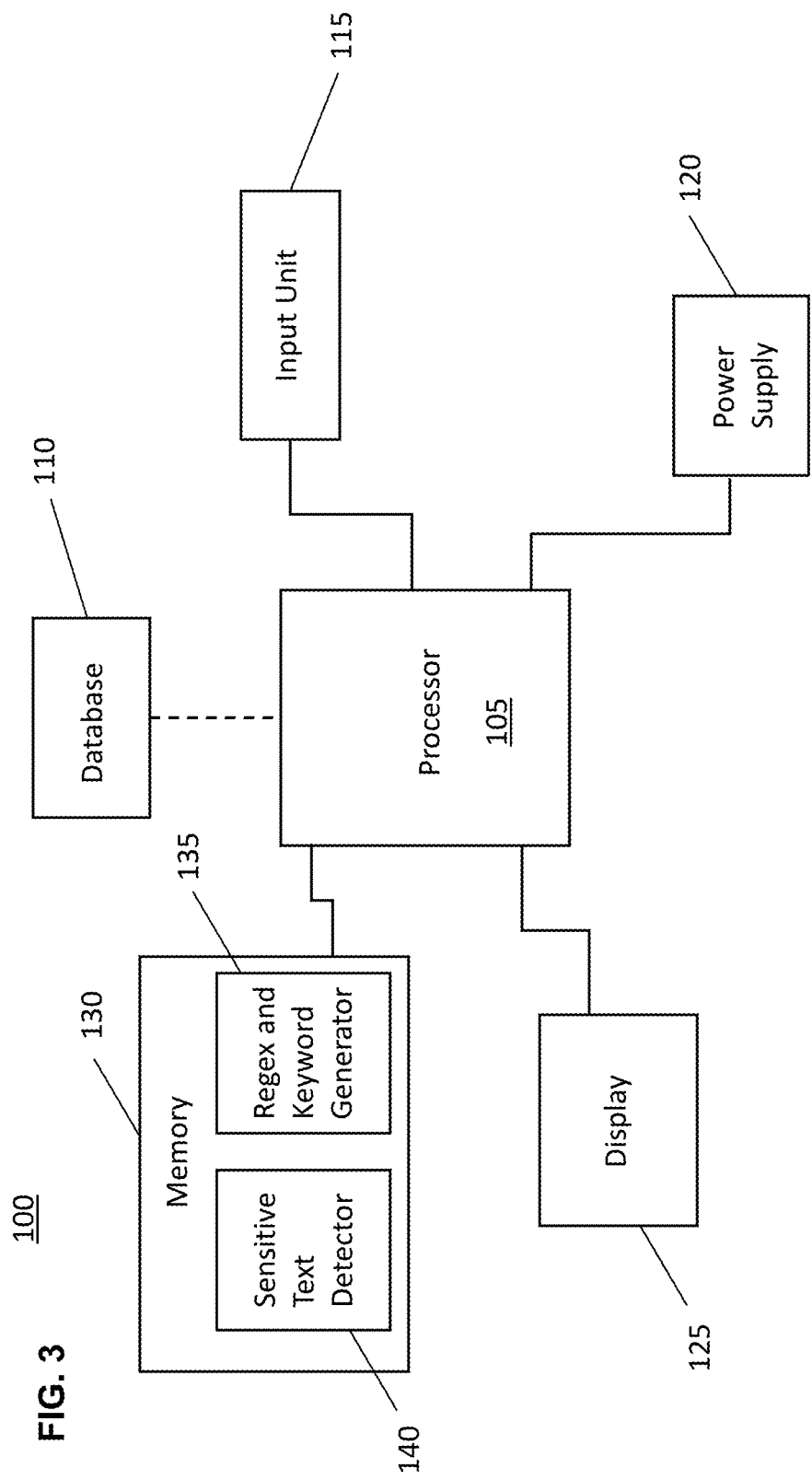
FIG. 3 is a schematic block diagram of a regular expression and keyword generator, according to an embodiment of the disclosure.

Turning to FIG. 3, there is shown an embodiment of the hardware components of a device generating a detector including a regular expression and keyword that may be used to implement any of the regular expression and keyword generating methods described herein. As described in further detail below, device 100 includes a processor 105, input unit 115, power supply module 120, display 125, and memory 130 including a sensitive text detector 140 and regex and keyword generator 135.

Processor 105 is a control center of device 100. Processor 105 is connected to each part of device 105 by using various interfaces and lines, and performs various functions of device 100 and processes data by running or executing applications stored in memory 130, and invoking data and instructions that are stored in memory 130. In some embodiments, processor 105 may include one or more processing units. An application processor and a modem processor may be integrated into processor 105. The application processor mainly processes an operating system, a user interface, an application, and the like, and the modem processor mainly processes wireless communication. It should be understood that the modem processor does not have to be integrated in processor 105. For example, processor 105 may be a Kirin chip 970 manufactured by Huawei Technologies Co., Ltd.

Input unit 115 is configured to provide various interfaces for an external input/output device (for example, a physical keyboard, a physical mouse, a display externally connected to device 100, an external memory, or a subscriber identity module card). For example, a mouse is connected by using a universal serial bus interface, and a subscriber identity module (subscriber identity module, SIM) card provided by a telecommunications operator is connected by using a metal contact in a subscriber identity module card slot. Input unit 112 may be configured to couple the external input/output peripheral device to processor 105 and memory 130.

Device 100 further includes a power supply module 120 (for example, a battery and a power supply management chip) that supplies power to the components of device 100. The battery may be logically connected to processor 105 by using the power supply management chip, so that functions such as charging management, discharging management, and power consumption management are implemented.

Display 125 may be configured to display information entered by the user or information provided for the user, and various menus of device 100. For example, display 125 may further include two parts: a display driver chip and a display module (not shown). The display driver chip is configured to receive a signal or data sent by processor 105, to drive a corresponding screen to be displayed on the display module. After receiving the to-be-displayed related information sent by processor 105, the display driver chip processes the information, and drives, based on the processed information, the display module to turn on a corresponding pixel and turn off another corresponding pixel, for example.

Memory 130 is configured to store one or more applications and data. Processor 105 runs the one or more applications and the data that are stored in memory 130, to perform the various functions of device 105 and data processing. The one or more applications include a sensitive text detector 140 and a regex and keyword generator 135, embodiments of which are described herein. Memory 130 mainly includes a program storage area and a data storage area. The program storage area may store the operating system, an application required by at least one function, and the like. The data storage area may store data created based on use of device 100. In addition, memory 130 may include a high-speed random access memory, and may further include a non-volatile memory, for example, a magnetic disk storage device, a flash memory device, or another non-volatile solid-state storage device. Memory 130 may store various operating systems such as an iOS® operating system developed by Apple® Inc. (IOS is a registered trademark of Cisco Technology Inc., San Jose, CA, USA; APPLE is a registered trademark of Apple Inc., Cupertino, CA, USA) and an ANDROID® operating system developed by Google Inc. It should be noted that any of the one or more applications may alternatively be stored in a cloud, in which case device 100 obtains the one or more applications from the cloud. For example, one or more of sensitive text detector 140 and regex and keyword generator 135 may be stored in a remote server or database 110 that may be accessed by device 100 using, for example, a suitable wireless communication module (not shown).

The following embodiments may all be implemented on an electronic device with the foregoing hardware structure.

Figure 4:
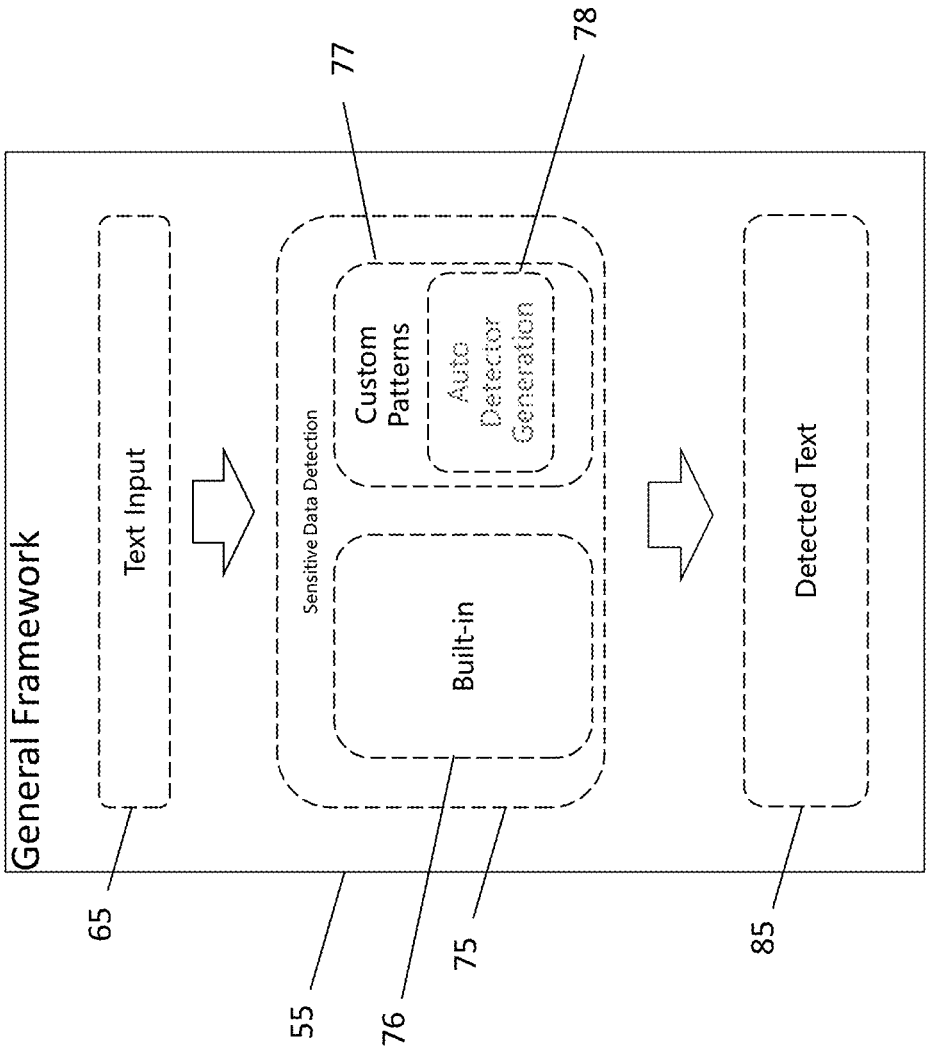
FIG. 4 is a schematic diagram of a sensitive text detector according to an embodiment of the disclosure.

In contrast to detector pipeline 50 shown in FIG. 2, FIG. 4 shows the general framework of a sensitive text detector pipeline 55 according to an embodiment of the disclosure. Text input 65 is received at a sensitive text detector 75 that includes both a built-in component 76 and a custom component 77. Custom component 77 includes an automatically-generated component 78 that defines regular expressions and/or keywords that have been generated using a regex and keyword generator according to embodiments as described herein. The output 85 of sensitive text detector 75 comprises sensitive text contained within text input 65 and that is identified by both built-in component 77 and custom component 78.

Figure 5:
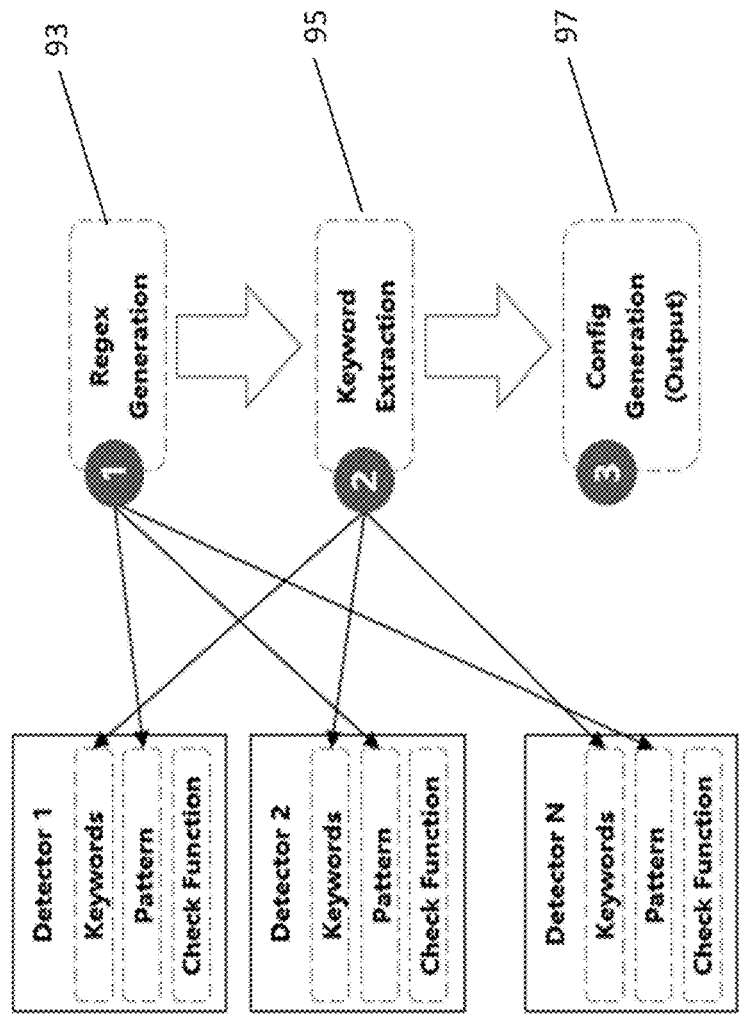
FIG. 5 is a schematic diagram of a sensitive text detector pipeline according to an embodiment of the disclosure.

FIG. 5 shows a pipeline of sensitive text detectors (Detector 1 through Detector N) each configured to identify and extract sensitive text from different types of text input. When deploying the regex and keyword generator as described herein, regular expressions 93 and keywords 95 that are generated by the regex and keyword generator may be used to configure the custom components of the sensitive text detectors. At block 97, the outputs of the regex and keyword generator are assembled into a machine-readable configuration file.

Figure 6:
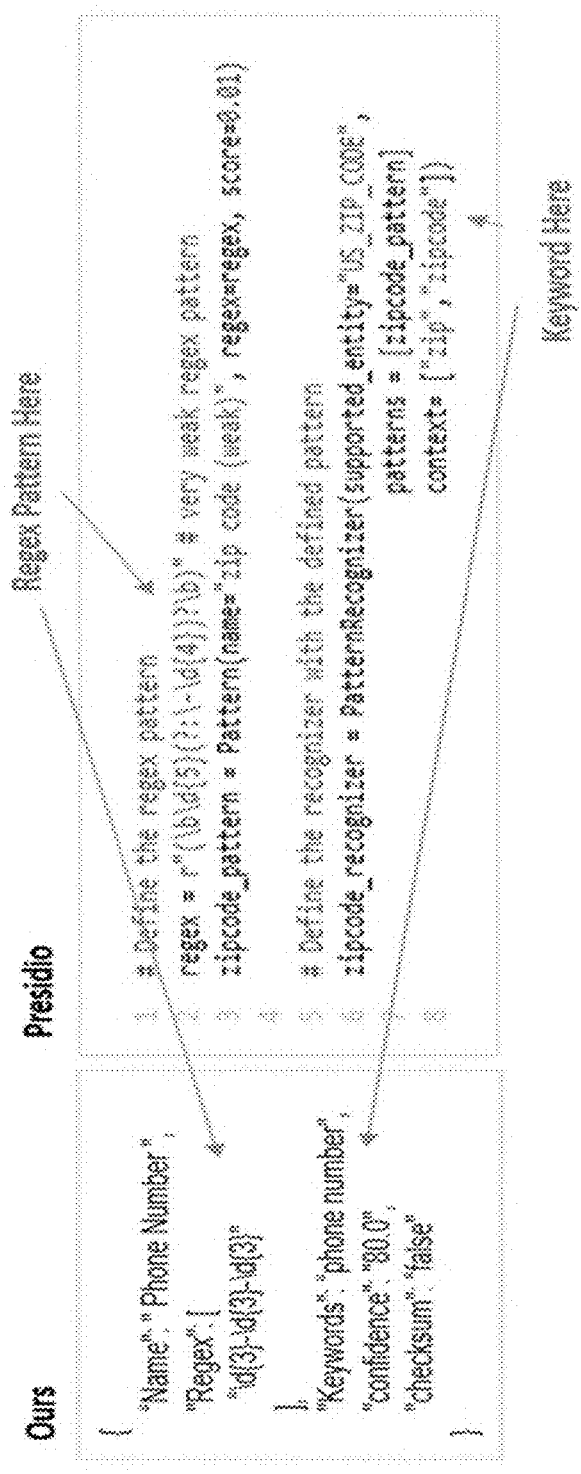
FIG. 6 shows an example of outputs of a sensitive text detector according to an embodiment of the disclosure and a sensitive text detector according to the prior art.

FIG. 6 shows, on the left-hand side, an example of a configuration file that may be output by a regex and keyword generator according to an embodiment of the disclosure. The regular expression that is output is "\d{3}-\d{3}-\d{3}" and the keyword that is output is "phone number". On the right-hand side is shown an example of a configuration file that is used by an existing sensitive text detector, and the locations within the configuration at which the output regular expression and keyword may be inserted in order to customize the sensitive text detector.

Figure 7:
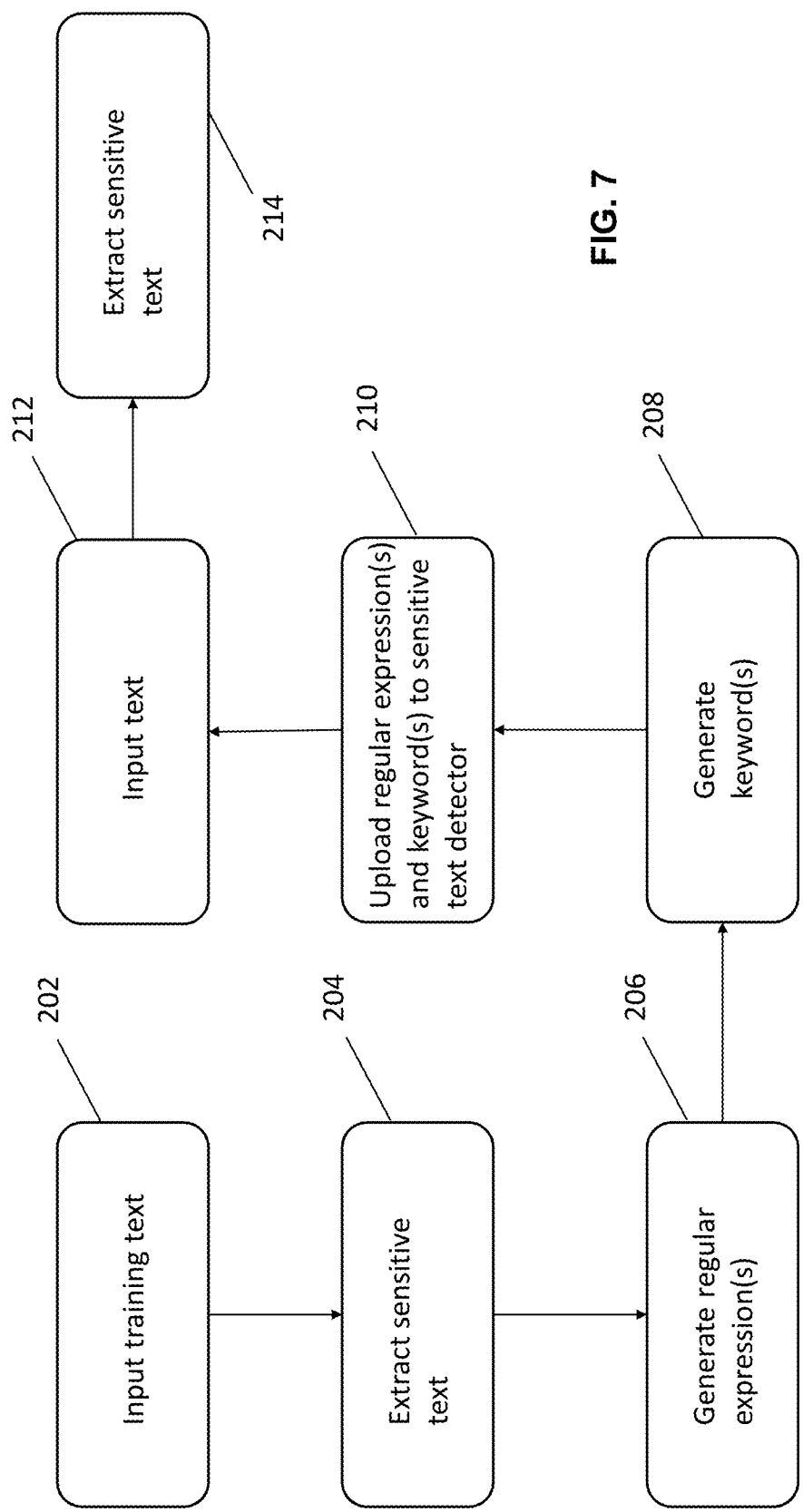
FIG. 7 is a flow diagram of a method of generating a regular expression and a keyword, according to an embodiment of the disclosure.

Turning to FIG. 7, there is now shown an example workflow diagram of a method of generating a regular expression and a keyword, using a regex and keyword generator according to an embodiment of the disclosure (for example, by using regex and keyword generator 135 described in connection with FIG. 3).

At block 202, training text is input to regex and keyword generator 135. The training text comprises a set of text inputs (for example, one or more text strings) and includes indications of the positions of any sensitive text within the text inputs. Preferably, the training text relates to the particular type of text that is being processed for sensitive text extraction. For example, if using a sensitive text detector configured to extract passport-related data, the training text may contain text containing samples of passport-related data, such as nationalities, addresses, and dates of birth.

At block 204, the portions of text within the training text input that contain sensitive data are extracted from the training text input by regex and keyword generator 135. For example, based on position information associated with the sensitive text, the sensitive text and a preset range of surrounding text (for example text that is located a predetermined number of characters before and after the sensitive text) is extracted from the training text input.

At block 206, regex and keyword generator 135 generates one or more regular expressions based on the extracted sensitive text. For example, as described in further detail below, one or more regular expressions associated with the extracted sensitive text may be evolved and, after multiple iterations of the evolution of the one or more regular expressions, a subset of the evolved regular expressions may be output by regex and keyword generator 135.

At block 208, regex and keyword generator 135 generates one or more keywords based on the extracted sensitive text. For example, as described in further detail below, a number of candidate keywords may be generated based on the extracted sensitive text. One or more keywords may be selected from among the candidate keywords, and output by regex and keyword generator 135.

According to some embodiments, keyword generation may take place before, or in parallel to, regular expression generation. According to still further embodiments, regex and keyword generator 135 may be configured to only generate keywords, or only generate regular expressions, and accordingly the operations associated with block 206, or block 208, may be skipped.

At block 210, the regular expression and keyword generated at blocks 206 and 208, respectively, are uploaded to a sensitive text detector, for example sensitive text detector 140 described in connection with FIG. 3.

At block 212, a text input is provided to sensitive text detector 140. For example, following from the above example, the text input may comprise data include sensitive passport-related text, and which needs to be extracted from the text input.

At block 214, sensitive text detector 140 identifies and extracts the sensitive text, using the regular expression and keyword generated by regex and keyword generator 135 at blocks 206 and 208, and uploaded to sensitive text detector 140 at block 210.

There will now be described in further detail a process by which regex and keyword generator 135 may generate a regular expression from a text input (for example, as performed at block 206). The regex generation algorithm described herein is a heuristic algorithm, although the regular expression generation algorithm described herein may be replaced by other types of regular expression generation algorithms. The algorithm is trained to construct regular expressions on both positive samples (that is samples of training text that include a sensitive text) and negative samples (that is samples of training text that do not include any sensitive text). The generated regular expressions are expected to be found in the positive samples as much as possible, and to not be found in the negative samples.

Figure 8:
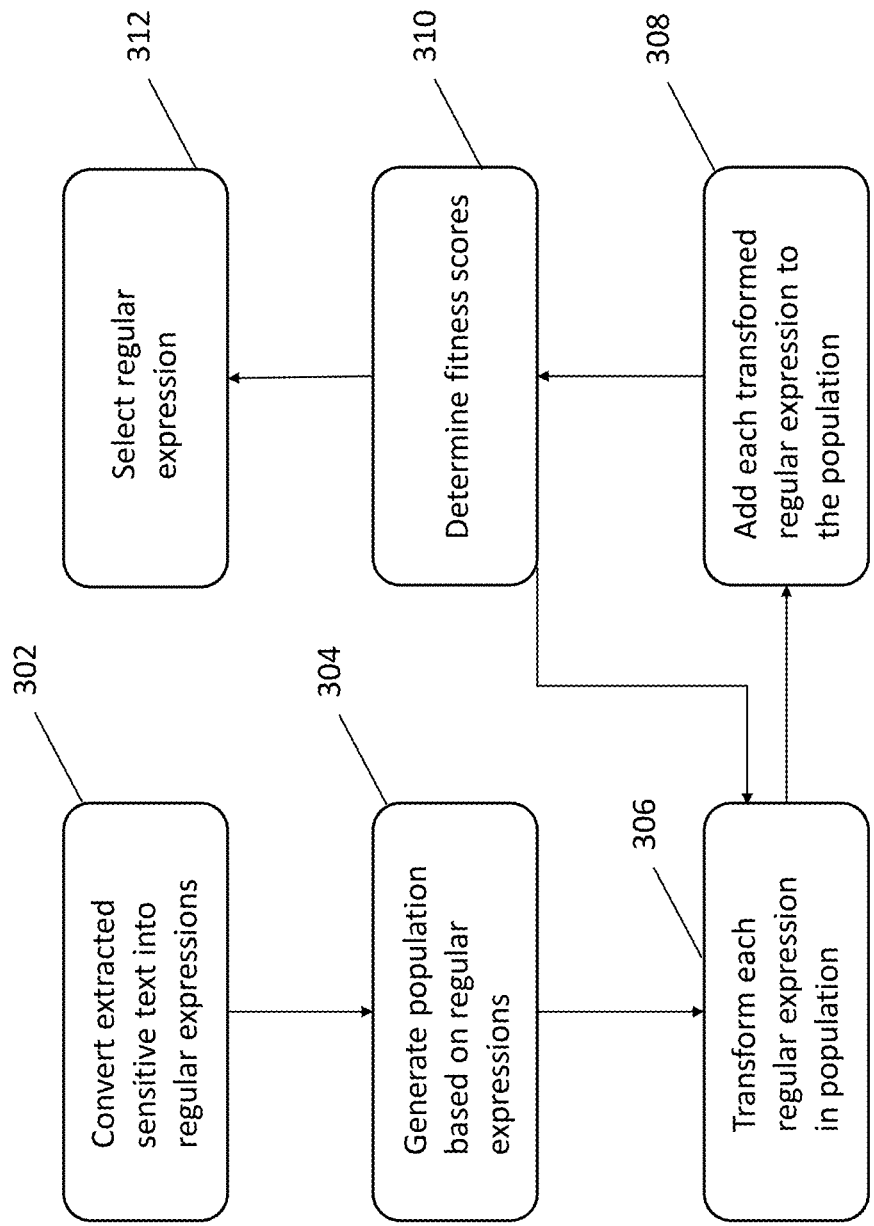
FIG. 8 is a flow diagram of a method of selecting a regular expression based on extracted sensitive text, according to an embodiment of the disclosure.

As described above, regex and keyword generator 135 first extracts the sensitive text from the training text input. Subsequently, and now turning to FIG. 8, at block 302, regex and keyword generator 135 converts or tokenizes the sensitive text into one or more regular expressions, based on predefined regular expression syntax. For example, assuming that the sensitive text includes the words "help", "helped", "reset", and "palet", this text is converted into the regular expressions "help", "help\w\w", and "\w\w\wet".

At block 304, an initial population is formed based on the regular expressions that represent the sensitive text. Following from the above example, the initial population is {help, help\w\w, \w\w\wet}. The population of regular expressions is then iteratively evolved at blocks 306, 308, and 310, as now described in further detail.

At block 306, one or more of a mutation and a crossover operation are performed on a randomly selected regular expression within the population. Regex and keyword generator 135 may randomly determine whether a regular expression is mutated and/or crossed-over with another regular expression. For example, a randomly selected regular expression may be mutated, crossed-over with another regular expression, or mutated and crossed-over with another regular expression.

Figure 9:
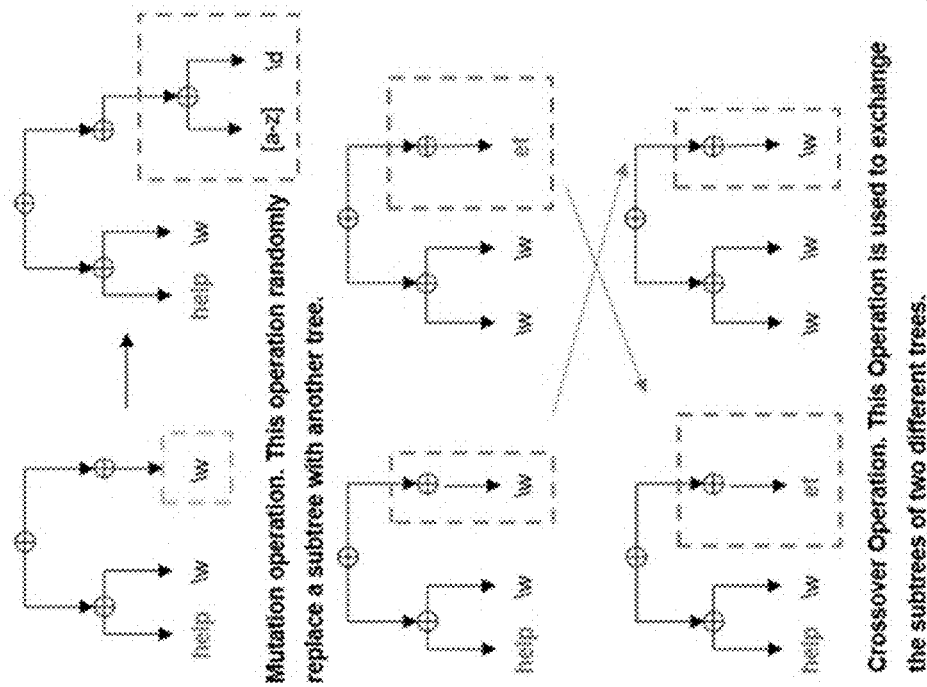
FIG. 9 is a schematic diagram of mutation and a crossover operations being performed on regular expressions, according to an embodiment of the disclosure.

When mutating a regular expression, a portion of the regular expression is randomly replaced with another portion. For instance, and as can be seen in FIG. 9, with the regular expression "help\w\w", the last portion "\w" is mutated into "[a–z]\d", thereby generating the new regular expression "help\w[a–z]\d".

When performing a crossover operation, a portion of a first one of the regular expressions in the population is exchanged for a portion of a second one of the regular expressions in the population. For instance, with the regular expression "help\w\w" and the regular expression "\w\w\wet", the last portion "\w" of "help\w\w" is exchanged for the last portion "et" of "\w\w\wet", leading as can be seen in FIG. 9 to two new regular expressions: "help\wet" and "\w\w\w".

At block 308, the transformed regular expressions are added to the population.

At block 310, a fitness score is calculated for each regular expression in the population. Generally, when determining the fitness score, the algorithm looks for both: a degree of precision with which the regular expression in the population extracts sensitive text within positive training samples (that is samples of training text that include sensitive text); and a degree of precision with which the regular expression in the population does not extract text within negative training samples (that is samples of training text that do not include sensitive text). The greater the precision with which a regular expression in the population identifies sensitive text within positive training samples, the greater the fitness score.

According to one embodiment, the fitness score may be calculated as follows:

$$f(r) = f_s(r) + f_{char}(r) + L_{score}(r), \text{ wherein:}$$

r is the regular expression;
s is the text string;

$$f_s(r) = \frac{|[P]_r|}{|[P \cup N]_r|}$$

(that is the precision of r);
$f_{char}(r) = f_{charprec}(r) + f_{charrec}(r)$ (that is the character-level accuracy of r);

$$f_{charprec}(r) = \frac{\|[P]_r\|}{\|[P \cup N]_r\|} + \frac{\sum_{s \in P\setminus[P]_r} \text{count}(r, s)}{\sum_{s \in (P \cup N)\setminus[P \cup N]_r} \text{count}(r, s)}$$

(that is the character-level precision of r, the goal is to maximize the ratio of the number of characters matched with positive training samples to the number of characters matched with negative training samples);

$$f_{charrec}(r) = \frac{\|[P]_r\|}{\|P\|} + \frac{\sum_{s \in N\setminus[N]_r} \text{count}(r, s)}{\|N\|}$$

(that is the character-level recall of r, the goal is to maximize the number of characters matched with positive training samples and the number of characters not matched with negative training samples);
∥P∥ is the sum of the lengths of all the training samples in the set P;
count(r, s) is the total number of characters in s matched by r; and $$L_{score}(r) = e^{-\left|len(r) - \frac{\|P\|}{|P|}\right|}$$

(that is regular expressions whose lengths are similar to the lengths of positive training samples are considered better solutions).

As described above, after having calculated the fitness score for each regular expression in the population, regex and keyword generator 135 iterates the evolution process. In particular, regex and keyword generator 135 performs the operations of blocks 306-310 again on the population of regular expressions which now includes the regular expressions that were transformed at block 306. The fitness scores of the regular expressions will adjust with each iteration of the evolution process. At the end of each iteration of the evolution, the fitness scores are compared to one or more predefined thresholds. For example, regex and keyword generator 135 may determine when one or more of the fitness scores is in a steady state. A steady state may be defined as a state in which the fitness score has not varied by more than a present amount over a preset number of iterations. Upon determining that a fitness score is in a steady state, the iteration ends and regex and keyword generator 135 may select the corresponding regular expression, at block 312. Alternatively, the iteration may end after a preset number of iterations have been performed, in which case regex and keyword generator 135 will select the regular expression with the highest fitness score. The selected regular expression is output by regex and keyword generator 135, as described above in connection with block 206 of FIG. 7.

It was found that on average the above algorithm could achieve a 90% f1 score within a tolerable period of time.

Figure 10:
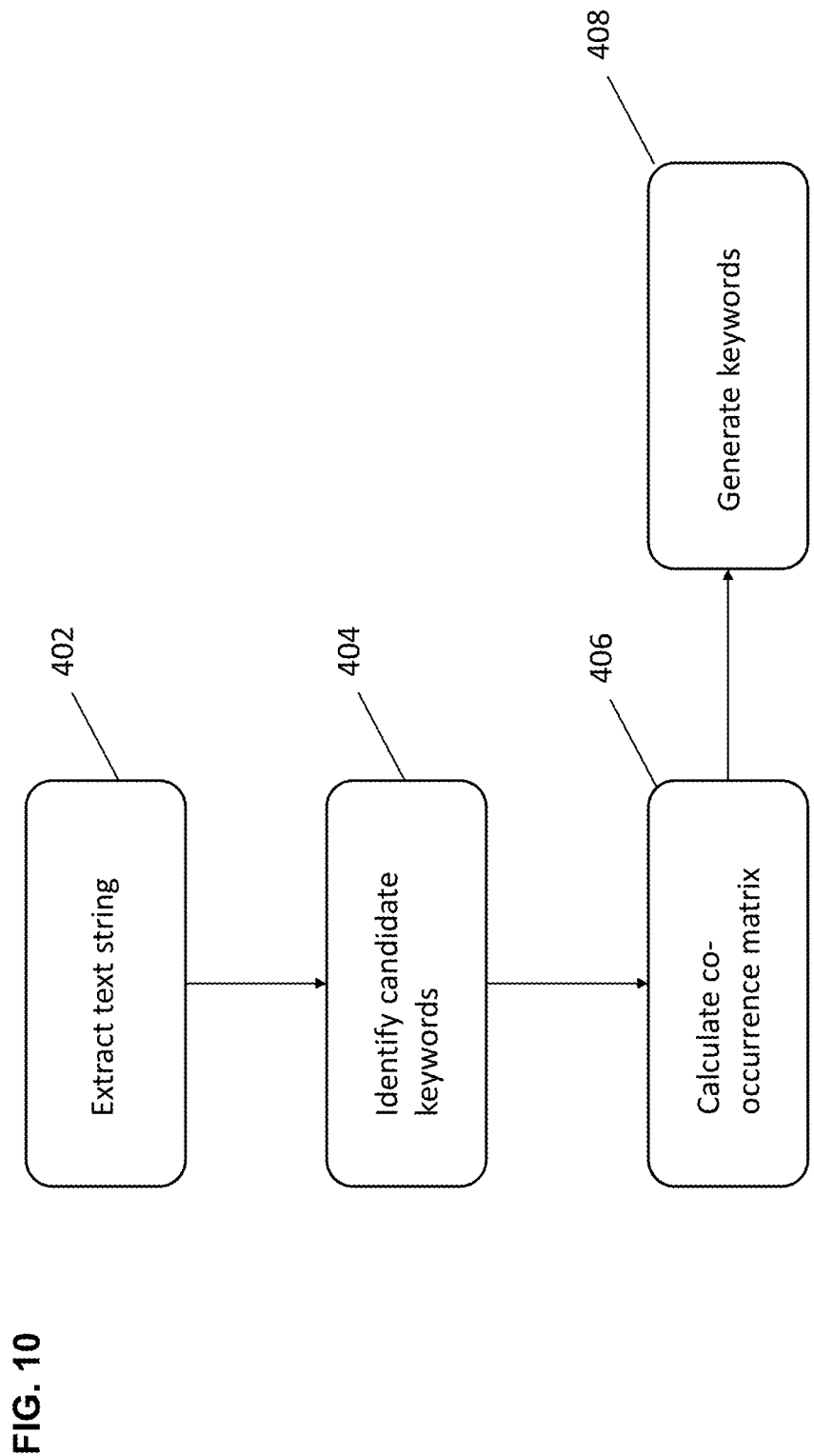
FIG. 10 is a flow diagram of a method of generating keywords based on an extracted range of text, according to an embodiment of the disclosure.
Figure 11:
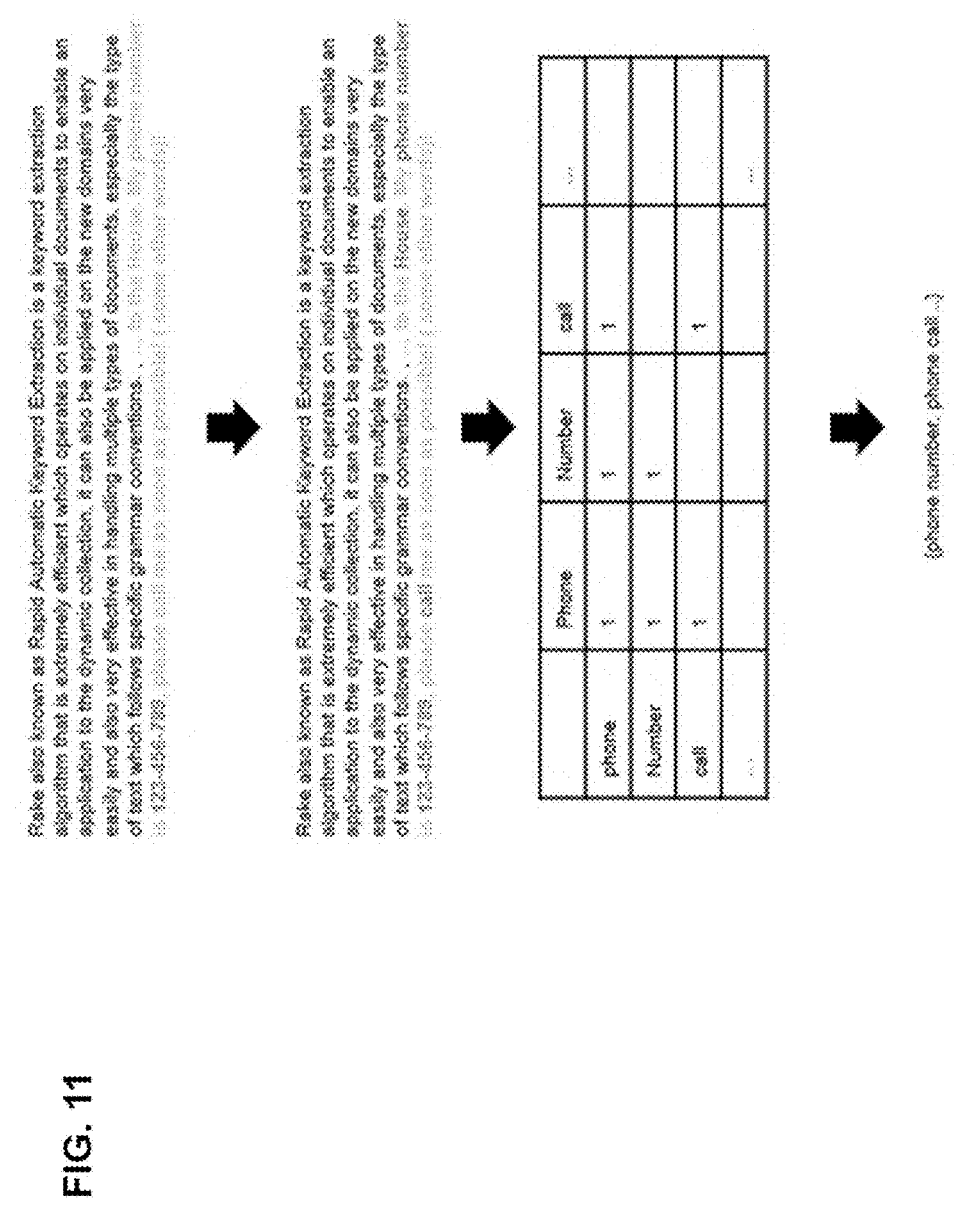

Turning to FIGS. 10 and 11, there is now described in further detail a process by which regex and keyword generator 135 may generate a keyword from a text input (for example, as performed at block 208). The keyword extraction algorithm described herein is an unsupervised, domain-independent keyword extraction algorithm, although the disclosure extends to other types of keyword extraction algorithms. For example, according to some embodiments, regex and keyword generator 135 may be configured to generate a regular expression using the methods described herein, and keyword extraction may be performed using a term frequency-inverse document frequency (TF-IDF) algorithm.

At block 402, regex and keyword generator 135 extracts a range of text (for example, one or more text strings) based on locations of the sensitive text within the text input received at regex and keyword generator 135 at block 202. For example, according to some embodiments, regex and keyword generator 135 selects and extracts all text located a preset distance (for example a preset number of characters) before the sensitive text contained within the text input, and all text located a present distance (for example a preset number of characters) after the sensitive text contained within the text input. An example of a range of text that is selected based the position of sensitive text contained within the input text can be seen in FIG. 11, with the range of text " . . . to the House [ . . . ] some other words)!" encompassing the sensitive text "123-456-789".

At block 404, regex and keyword generator 135 identifies one or more candidate keywords within the range of text. For example, according to some embodiments, regex and keyword generator 135 compares each word within the range of text to words contained within a list of stop words (such a list may be stored, for example, in memory 130 or in database 110). Stop words may comprise words that are quite common in usage and that therefore generally do not relate to sensitive data. If a word within the range of text is contained within the list of stop words, regex and keyword generator 135 determines that it is not a candidate keyword and discounts it. Regex and keyword generator 135 may then select any remaining words within the range of text as a candidate keyword. Examples of candidate keywords in FIG. 11 include "House", "phone", "number", and "call".

At block 408, regex and keyword generator 135 generates one or more keywords based on the candidate keywords. The generation of the keywords may be based, for example, on a frequency with which each candidate keyword appears within in the range of text, and a co-occurrence of each candidate keyword with another one of the candidate keywords in the range of text. The generation of the keywords may based, for instance, on the ratio of co-occurrence to frequency of each candidate keyword. In order to determine a co-occurrence of each candidate keyword with another one of the candidate keywords in the range of text, as well as a frequency of each candidate keyword, regex and keyword generator 135 may calculate a co-occurrence matrix (block 406) as can be seen in FIG. 11.

Based on the result of the co-occurrence matrix, one or more keywords are generated based on the list of candidate keywords. For example, those candidate keywords scoring the highest on the co-occurrence matrix may be selected as keywords. As can be seen in the example FIG. 11, "phone number" and "phone call" are generated as keywords from the list of candidate keywords "phone", "number", and "call".

Figure 12:
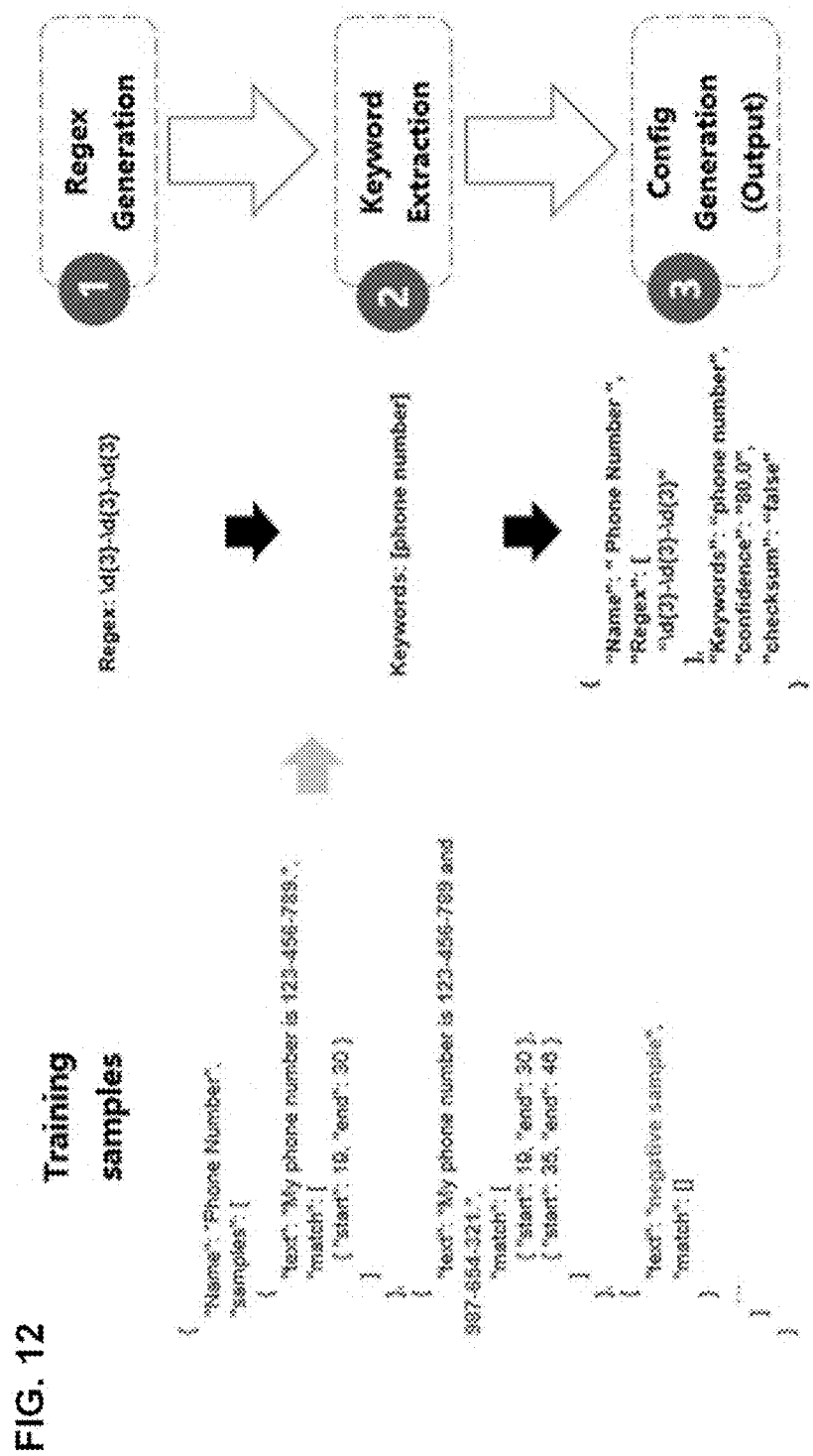
FIG. 12 shows another example of an output of a sensitive text detector according to an embodiment of the disclosure.

FIG. 12 shows, on the left-hand side, an example of positive and negative training samples that are provided to regex and keyword generator 135. The upper two positive training samples identify the locations of the sensitive text within the training samples, while the lowermost training sample is a negative training sample meaning that it does not include any sensitive text. After inputting the training samples to regex and keyword generator 135, regex and keyword generator 135 outputs a regular expression ("\d{3}-\d{3}-\d{3}"), a keyword ("phone number"), and a configuration file that includes the generated regular expression and keyword. The configuration file is in a format suitable for uploading to a sensitive text detector.

The below table illustrates precision and recall rates using various existing sensitive text detectors. Precision (Generated) and Recall (Generated) are the respective rates using an automatic regex and keyword generator as described herein, whereas Precision (Given) and Recall (Given) are the respective rates using hand-written regex and keyword parameters provided by the detector in question. Time for matching (Generated: Given) is a measure of the ratio of the time taken to extract the sensitive text using an automatic regex and keyword generator as described herein relative to the time taken to extract the sensitive text using hand-written regex and keyword parameters provided by the detector in question.

| Test# | Detector | Precision (Generated) | Recall (Generated) | Precision (Given) | Recall (Given) | Time for matching (Generated: Given) |
|---|---|---|---|---|---|---|
| 1 | Brazil Legal Entity Number (CNPJ) | 0.99 | 1 | 1 | 1 | 0.98 |
| 2 | Brazil CPF Number | 1 | 1 | 1 | 1 | 0.84 |
| 3 | Denmark Personal Identification Number | 0.97 | 1 | | 1 | 0.58 |
| 4 | Email Address | 1 | 0.92 | 1 | 1 | 3.72 |

| Test# | Detector | Precision (Generated) | Recall (Generated) | Precision (Given) | Recall (Given) | Time for matching (Generated: Given) |
|---|---|---|---|---|---|---|
| 5 | Finland National ID | 0.87 | 0.98 | 0.91 | 1 | 3.6 |
| 6 | International Banking Account Number (IBAN) | 1 | 1 | 1 | 1 | 1.22 |
| 7 | France Social Security Number (INSEE) | 0.99 | 1 | 0.99 | 1 | 0.96 |
| 8 | Brazil National ID Card (RG) | 0.91 | 1 | 0.9 | 1 | 1.92 |
| 9 | South Korea Resident Registration Number | 1 | 1 | 1 | 0.9 | 1.36 |
| 10 | Taiwan National ID | 1 | 1 | 1 | 1 | 1.08 |

As can be seen, the above experimental results demonstrate that a reasonable detector can be customized to produce results comparable to existing detectors that use human-written regex and keyword parameters. As can be seen from the table, the time required for text extraction using an automatic regex and keyword generator as described herein is about three times more to one time less than the time required for text extraction using a detector with human-written regex and keyword parameters. The precision and recall rates using an automatic regex and keyword generator as described herein can be even higher than those of detectors using human-written regex and keyword parameters.

Figure 13:
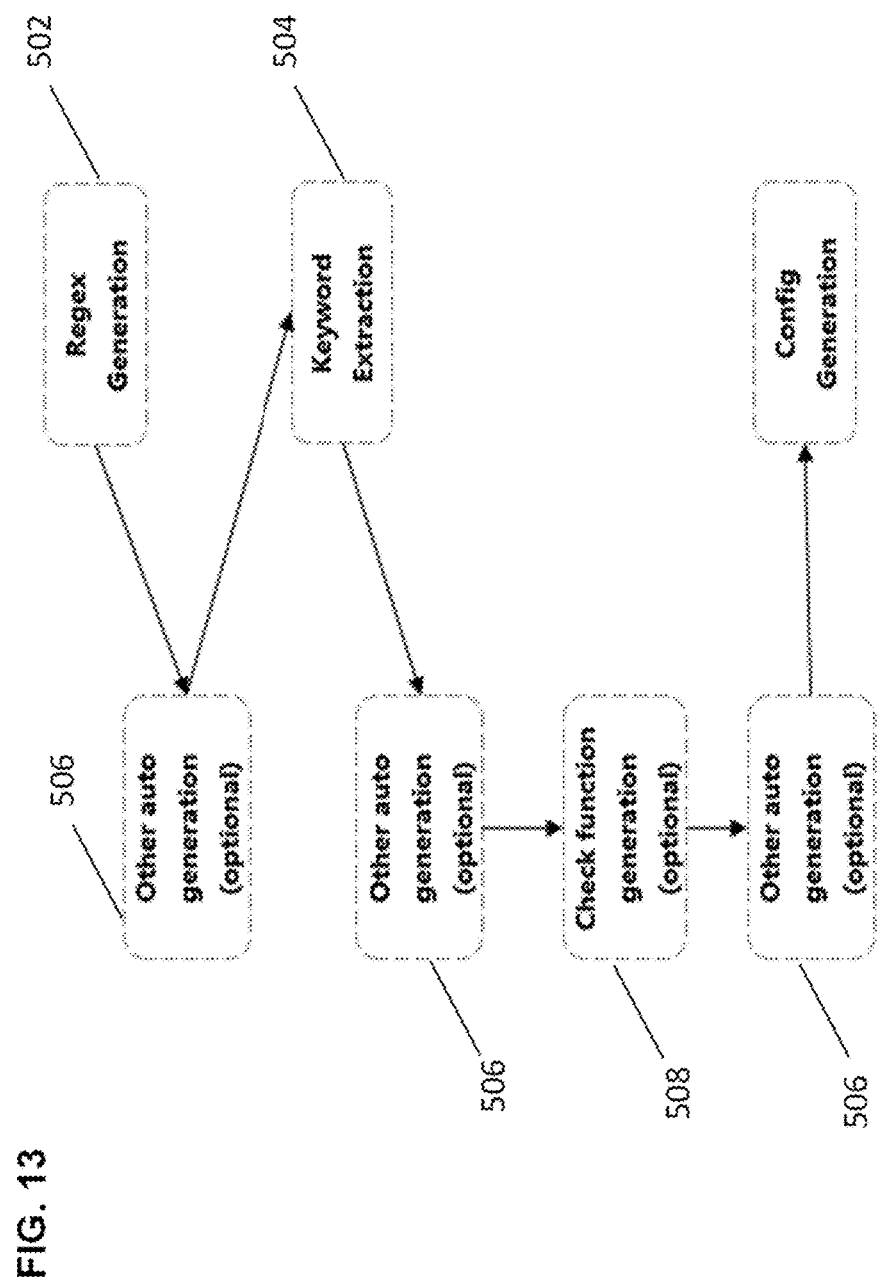
FIG. 13 is a schematic diagram of a sensitive text detector pipeline according to another embodiment of the disclosure.

According to some embodiments, other components may be added to the detector pipeline, as can be seen for example in FIG. 13. In FIG. 13, the detector pipeline includes, in addition to a regular expression generating component 502 and a keyword generating component 504, other automatic generator components 506 and a check function generator component 508. Automatic generator components may include, for example, a blacklist generator that may generate a list of keywords that must be excluded, a whitelist generator that may generate a list of keywords that must be included, and a deny list generator that may generate a list of regular expressions that must be excluded. In addition, a confidence score generator may be included, which may output a score indicative of a confidence with which a regular expression or a keyword is generated. A configuration file 510 is generated as the output of the detector pipeline, similarly to what is shown in FIG. 12. The order of the various components of the pipeline does not necessarily affect the output of the pipeline, and the various components can be arranged in any order as needed, or may be disposed in parallel.

Embodiments of the disclosure may be used in other scenarios besides sensitive text detector generation. For example, embodiments of the disclosure may be used in text pattern extraction, to extract meaningful patterns from text inside a large amount of data for further processing. The extracted words or patterns may be used in a whitelist or blacklist, for example. According to other embodiments, embodiments of the disclosure may be used in data indexing. For example, extracting words and patterns may be used to enrich data indexing in a search engine (for instance, keywords can be used as search criteria inside the Elasticsearch engine).

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

The invention claimed is:

1. A computer-implemented method of configuring a sensitive text detector, comprising:
receiving a set of text inputs comprising sensitive text;
extracting the sensitive text from the set of text inputs;
generating, based on the extracted sensitive text, a machine-readable configuration file comprising one or more keywords and one or more regular expressions;
inputting the machine-readable configuration file to a sensitive text detector to configure the sensitive text detector to detect the one or more keywords and the one or more regular expressions;
inputting a text input to the configured sensitive text detector; and
using the sensitive text detector to:
detect one or both of:
(i) at least one of the one or more keywords in the text input based on an exact match between a first character sequence in the text input and a second character sequence of the at least one keyword, wherein the at least one keyword consists of the second character sequence; and
(ii) at least one of the one or more regular expressions; and
extract, based on one or both of the detected at least one keyword and the detected at least one regular expression, sensitive text comprised in the text input,
wherein generating the machine-readable configuration file comprises:
tokenizing the extracted sensitive text into one or more regular expressions based on predefined regular expression syntax;
generating a population comprising the one or more regular expressions;
evolving the population by:
transforming at least one of the one or more regular expressions;
adding the at least one transformed regular expression to the population; and
determining a fitness score for each regular expression in the population;
iterating the evolution of the population until a predetermined condition is met, wherein the predetermined condition is met when one or more of the fitness scores is in a steady state defined as a state in which the one or more fitness scores have not varied by more than a preset amount over a preset number of iterations; and in response to the predetermined condition being met, generating, based on each fitness score, the machine-readable configuration file comprising the one or more regular expressions, wherein determining the fitness score for each regular expression in the population comprises:

for each of multiple training samples in a training set of training samples, each training sample either comprising sensitive text or not comprising sensitive text:
identifying text within the training sample based on the regular expression; and
determining the fitness score based on the identified text,
and wherein determining the fitness score based on the identified text comprises determining, for each training sample not comprising sensitive text, an amount of the identified text.

2. The method of claim 1, wherein:
extracting the sensitive text from the set of text inputs comprises:
extracting a range of text based on a location of the sensitive text within the set of text inputs; and
the generating comprises:
identifying one or more candidate keywords within the range of text; and
generating, based on the one or more candidate keywords, the machine-readable configuration file.

3. The method of claim 2, wherein extracting the range of text comprises:
extracting a combination of the sensitive text and text that is one or more of:
a preset distance before the sensitive text; and
a preset distance after the sensitive text.

4. The method of claim 2, wherein identifying the one or more candidate keywords comprises:
filtering the range of text by removing one or more words from the range of text; and
identifying the one or more candidate keywords within the filtered range of text.

5. The method of claim 4, wherein filtering the range of text comprises:
comparing each word in the range of text to each of multiple words in a list of stop words; and
based on the comparison, removing from the range of text any word contained in the list of stop words.

6. The method of claim 2, wherein generating, based on the one or more candidate keywords, the machine-readable configuration file comprises:
calculating one or more of:
a co-occurrence in the range of text of each candidate keyword with at least one other candidate keyword; and
a number of instances of each candidate keyword in the range of text.

7. The method of claim 1, further comprising:
applying a check function to the one or more keywords.

8. A computing device for configuring a sensitive text detector, comprising:
one or more processors configured to:
receive a set of text inputs comprising sensitive text;
extract the sensitive text from the set of text inputs;
generate, based on the extracted sensitive text, a machine-readable configuration file comprising one or more keywords and one or more regular expressions;
input the machine-readable configuration file to a sensitive text detector to configure the sensitive text detector to detect the one or more keywords and the one or more regular expressions;
input a text input to the configured sensitive text detector; and
use the sensitive text detector to:
detect one or both of:
(i) at least one of the one or more keywords in the text input based on an exact match between a first character sequence in the text input and a second character sequence of the at least one keyword, wherein the at least one keyword consists of the second character sequence; and
(ii) at least one of the one or more regular expressions; and
extract, based on one or both of the detected at least one keyword and the detected at least one regular expression, sensitive text comprised in the text input,
wherein generating the machine-readable configuration file comprises:
tokenizing the extracted sensitive text into one or more regular expressions based on predefined regular expression syntax;
generating a population comprising the one or more regular expressions;
evolving the population by:
transforming at least one of the one or more regular expressions;
adding the at least one transformed regular expression to the population; and
determining a fitness score for each regular expression in the population;
iterating the evolution of the population until a predetermined condition is met, wherein the predetermined condition is met when one or more of the fitness scores is in a steady state defined as a state in which the one or more fitness scores have not varied by more than a preset amount over a preset number of iterations; and
in response to the predetermined condition being met, generating, based on each fitness score, the machine-readable configuration file comprising the one or more regular expressions,
wherein determining the fitness score for each regular expression in the population comprises:
for each of multiple training samples in a training set of training samples, each training sample either comprising sensitive text or not comprising sensitive text:
identifying text within the training sample based on the regular expression; and
determining the fitness score based on the identified text, and wherein determining the fitness score based on the identified text comprises determining, for each training sample not comprising sensitive text, an amount of the identified text.

9. The computing device of claim 8, wherein the one or more processors are further configured to determine the fitness score based on the extracted text by further:

determining,
for each training sample comprising sensitive text, a degree of similarity between the identified text and the sensitive text.

10. The computing device of claim 8, wherein the one or more processors are further configured to transform at least one of the one or more regular expressions by one or more of:
randomly modifying a portion of the at least one of the one or more regular expressions; and
exchanging the portion of the first one of the one or more regular expressions with the portion of the second one of the one or more regular expressions.

11. The computing device of claim 8, wherein the fitness score satisfies the following formula:
$f(r)=f_s(r)+f_{char}(r)+L_{score}(r)$, wherein $f_s(r)$ is based on a degree of similarity between all of the identified text and the sensitive text, $f_{char}(r)$ is based on a degree of similarity between a portion of the identified text and the sensitive text, and $L_{score}$ is based on a length of the identified text relative to a length of the sensitive text.

12. A computer-implemented method of generating a sensitive text detector, comprising:
receiving a set of text inputs comprising sensitive text;
extracting the sensitive text from the set of text inputs;
generating, based on the extracted sensitive text, a machine-readable configuration file comprising one or more regular expressions;
inputting the machine-readable configuration file to a sensitive text detector to configure the sensitive text detector to detect the one or more regular expressions;
inputting a text input to the configured sensitive text detector; and
using the sensitive text detector to:
detect, in the text input, sensitive text corresponding to at least one of the one or more regular expressions; and
extract the detected sensitive text,
wherein generating the machine-readable configuration file comprises:
tokenizing the extracted sensitive text into one or more regular expressions based on predefined regular expression syntax;
generating a population comprising the one or more regular expressions;
evolving the population by:
transforming at least one of the one or more regular expressions;
adding the at least one transformed regular expression to the population; and
determining a fitness score for each regular expression in the population;
iterating the evolution of the population until a predetermined condition is met, wherein the predetermined condition is met when one or more of the fitness scores is in a steady state defined as a state in which the one or more fitness scores have not varied by more than a preset amount over a preset number of iterations; and
in response to the predetermined condition being met, generating, based on each fitness score, the machine-readable configuration file comprising the one or more regular expressions,
wherein determining the fitness score for each regular expression in the population comprises:
for each of multiple training samples in a training set of training samples, each training sample either comprising sensitive text or not comprising sensitive text:
identifying text within the training sample based on the regular expression; and
determining the fitness score based on the identified text,
and wherein determining the fitness score based on the identified text comprises determining, for each training sample not comprising sensitive text, an amount of the identified text.

13. The method of claim 12, wherein the fitness score satisfies the following formula:

$$f(r)=f_s(r)+f_{char}(r)+L_{score}(r),$$

wherein $f_s(r)$ is based on a degree of similarity between all of the identified text and the sensitive text, $f_{char}(r)$ is based on a degree of similarity between a portion of the identified text and the sensitive text, and $L_{score}$ is based on a length of the identified text relative to a length of the sensitive text.

14. The method of claim 12, wherein transforming at least one of the one or more regular expressions comprises one or more of:
randomly modifying a portion of the at least one of the one or more regular expressions; and
exchanging a portion of a first one of the one or more regular expressions with a portion of a second one of the one or more regular expressions.

15. The method of claim 12, wherein determining the fitness score based on the extracted text further comprises:
determining, for each training sample comprising sensitive text, a degree of similarity between the identified text and the sensitive text.

* * * * *